US012553507B2

(12) United States Patent
Takagi

(10) Patent No.: US 12,553,507 B2
(45) Date of Patent: Feb. 17, 2026

(54) MACHINE COMPONENT, POWER TRANSMISSION DEVICE, AND ROBOT

(71) Applicant: NIDEC DRIVE TECHNOLOGY CORPORATION, Nagaokakyo (JP)

(72) Inventor: Daisuke Takagi, Nagaokakyo (JP)

(73) Assignee: NIDEC DRIVE TECHNOLOGY CORPORATION, Kyoto (JP)

( * ) Notice: Subject to any disclaimer, the term of this patent is extended or adjusted under 35 U.S.C. 154(b) by 178 days.

(21) Appl. No.: 18/224,604

(22) Filed: Jul. 21, 2023

(65) Prior Publication Data

US 2024/0035556 A1 Feb. 1, 2024

(30) Foreign Application Priority Data

Jul. 28, 2022 (JP) .................... 2022-120182

(51) Int. Cl.
*F16H 57/01* (2012.01)
*B25J 19/02* (2006.01)
*F16H 49/00* (2006.01)
*G01L 3/10* (2006.01)
*G01L 5/00* (2006.01)

(52) U.S. Cl.
CPC ............. *F16H 57/01* (2013.01); *B25J 19/02* (2013.01); *F16H 49/001* (2013.01); *G01L 3/108* (2013.01); *G01L 5/009* (2013.01)

(58) Field of Classification Search
CPC ......... G01L 3/108; G01L 5/009; F16H 57/01; F16H 49/001; B25J 19/02
See application file for complete search history.

(56) References Cited

U.S. PATENT DOCUMENTS

| 6,170,340 | B1 | 1/2001 | Horiuchi et al. |
| 2004/0079174 | A1* | 4/2004 | Horiuchi ............... G01L 3/1457 73/862.338 |

FOREIGN PATENT DOCUMENTS

| JP | 63-024103 A | 2/1988 | |
| JP | 09-184777 A | 7/1997 | |
| JP | 11-014474 A | 1/1999 | |
| JP | 2000-131160 A | 5/2000 | |
| JP | 2016-080052 A | 5/2016 | |
| WO | WO-0026625 A1 * | 5/2000 | ............ G01L 3/108 |
| WO | WO-2020149204 A1 * | 7/2020 | ............ G01L 3/108 |

* cited by examiner

Primary Examiner — Zakaria Elahmadi
(74) Attorney, Agent, or Firm — Keating & Bennett, LLP

(57) ABSTRACT

A machine component includes a base portion and strain gauges. The base portion extends in a direction intersecting a central axis. The strain gauges are provided on the base portion and arrayed in a circumferential direction about the central axis. Gap regions are provided between adjacent strain gauges in the circumferential direction. The gap regions include gap regions arranged at angular intervals of approximately 90° about the central axis.

17 Claims, 13 Drawing Sheets

MACHINE COMPONENT, POWER TRANSMISSION DEVICE, AND ROBOT

CROSS-REFERENCE TO RELATED APPLICATIONS

The present application claims priority under 35 U.S.C. § 119 to Japanese Patent Application No. 2022-120182, filed on Jul. 28, 2022, the entire contents of which are hereby incorporated herein by reference.

1. Field of the Invention

The present disclosure relates to a machine component, a power transmission device, and a robot.

2. Background

In recent years, demand for a wave reducer on a joint of a robot and the like is increasing. A conventional wave reducer has a plurality of strain gauges. Each strain gauge is attached to an externally toothed gear that rotates at a rotational speed after deceleration. This enables detection of torque applied to the externally toothed gear.

However, the conventional externally toothed gear is flexurally deformed by a wave generator having an elliptical contour. For this reason, not only the torque due to the external force originally desired to be measured but also sinusoidal torque (hereinafter referred to as "ripple torque") due to the flexural deformation by the wave generator is generated in the externally toothed gear. The strain gauge detects this ripple torque together with the torque generated in the externally toothed gear by the external force.

The plurality of strain gauges are arranged on the surface of the externally toothed gear at intervals in the circumferential direction. Therefore, the ripple torque applied to the externally toothed gear is not detected in a gap region between adjacent strain gauges in the circumferential direction. Such detection loss of ripple torque causes an error in torque detection.

SUMMARY

An example embodiment of the present disclosure is a machine component including a base portion extending in a direction intersecting a central axis, and a plurality of strain gauges provided on the base portion and arrayed in a circumferential direction about the central axis, a plurality of gap regions are provided between the strain gauges adjacent to each other in a circumferential direction, and the plurality of gap regions include gap regions arranged at angular intervals of approximately 90° about the central axis.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present application will be described with reference to the drawings.

Figure 1:
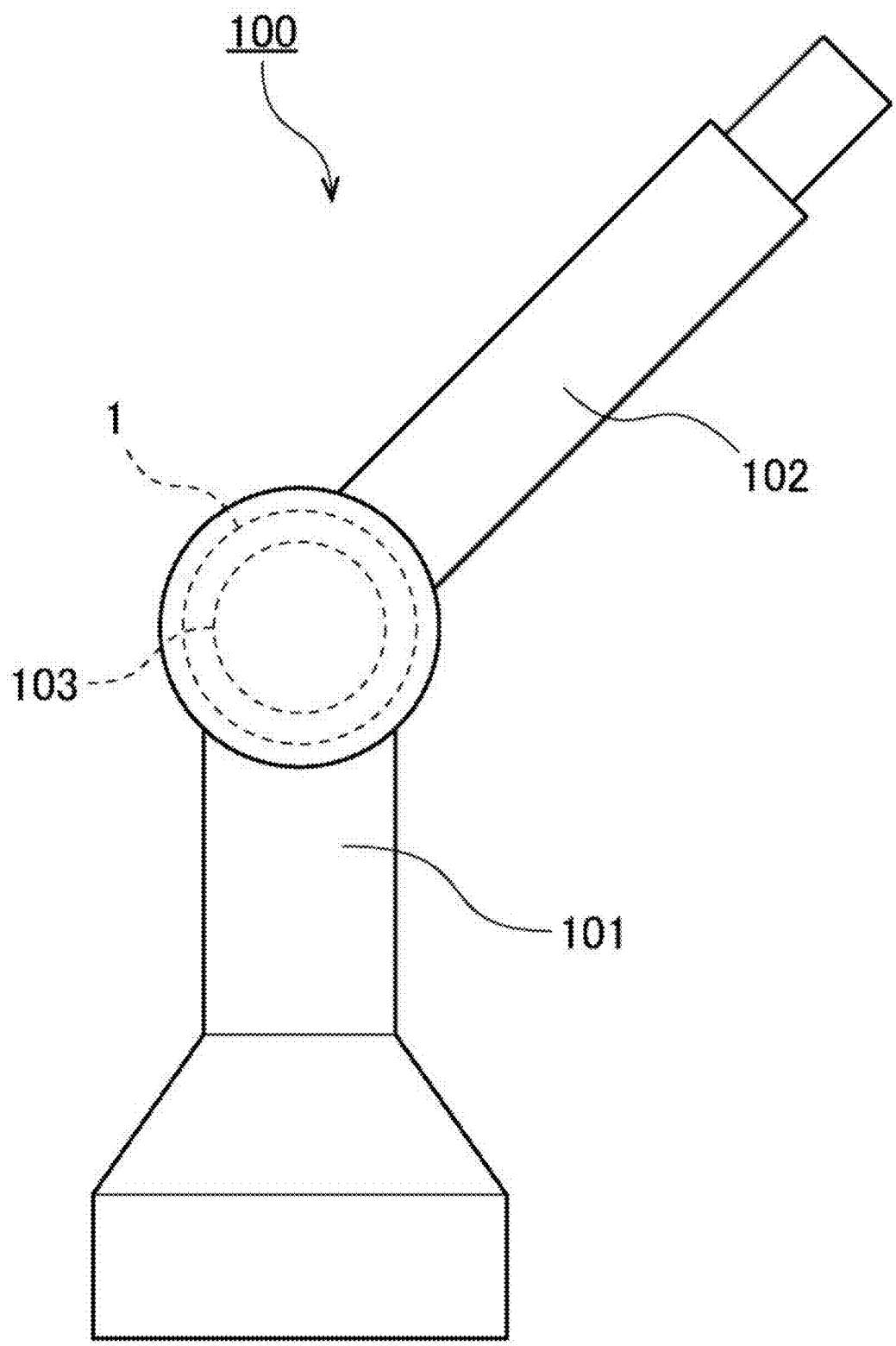
FIG. 1 is a schematic view of a robot according to an example embodiment of the present application.

FIG. 1 is a schematic view of a robot 100 including a power transmission device 1 according to one example embodiment. For example, a robot 100 is what is called an industrial robot that performs works such as conveyance, processing, and assembly of components in a manufacturing line of an industrial product. As shown in FIG. 1, the robot 100 includes a base frame 101, an arm 102, a motor 103, and the power transmission device 1.

The arm 102 is pivotally supported with respect to the base frame 101. The motor 103 and the power transmission device 1 are incorporated in a joint portion between the base frame 101 and the arm 102. When a drive current is supplied to the motor 103, a rotational motion is output from the motor 103. The rotational motion output from the motor 103 is decelerated by the power transmission device 1 and transmitted to the arm 102. Due to this, the arm 102 pivots with respect to the base frame 101 at a speed after deceleration.

Since the robot 100 includes the power transmission device 1, the robot 100 having a small torque detection error can be achieved by a mechanism described later.

Next, a detailed structure of the power transmission device 1 will be described.

Hereinafter, a direction parallel to a central axis 9 of the power transmission device 1 is referred to as "axial", a direction orthogonal to the central axis 9 of the power transmission device 1 is referred to as "radial", and a direction along an arc about the central axis 9 of the power transmission device 1 is referred to as "circumferential". However, the term "parallel" mentioned above also includes substantially parallel. The "orthogonal" mentioned above also includes substantially orthogonal.

Figure 2:
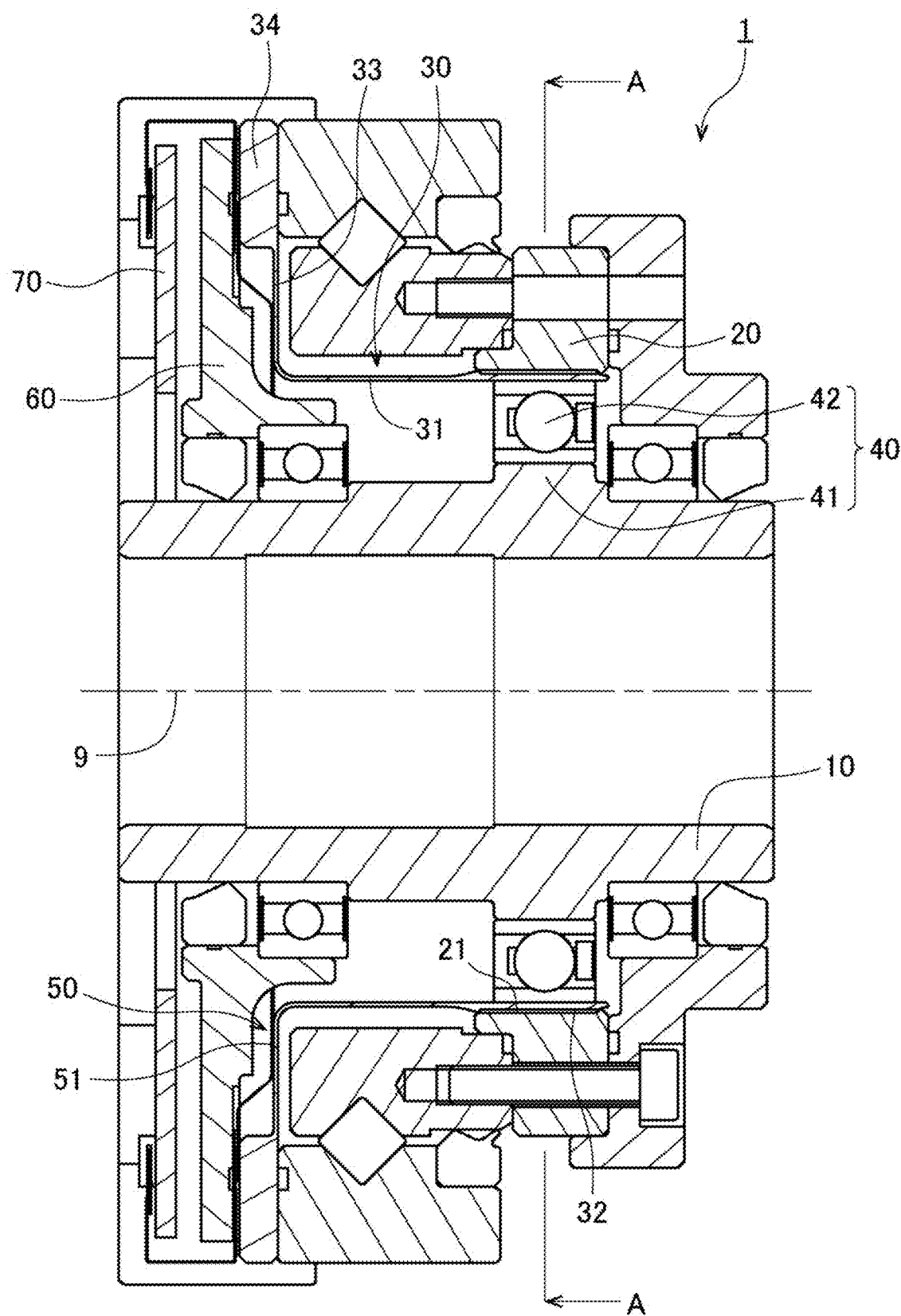
FIG. 2 is a longitudinal cross-sectional view of a power transmission device according to an example embodiment of the present application.
Figure 3:
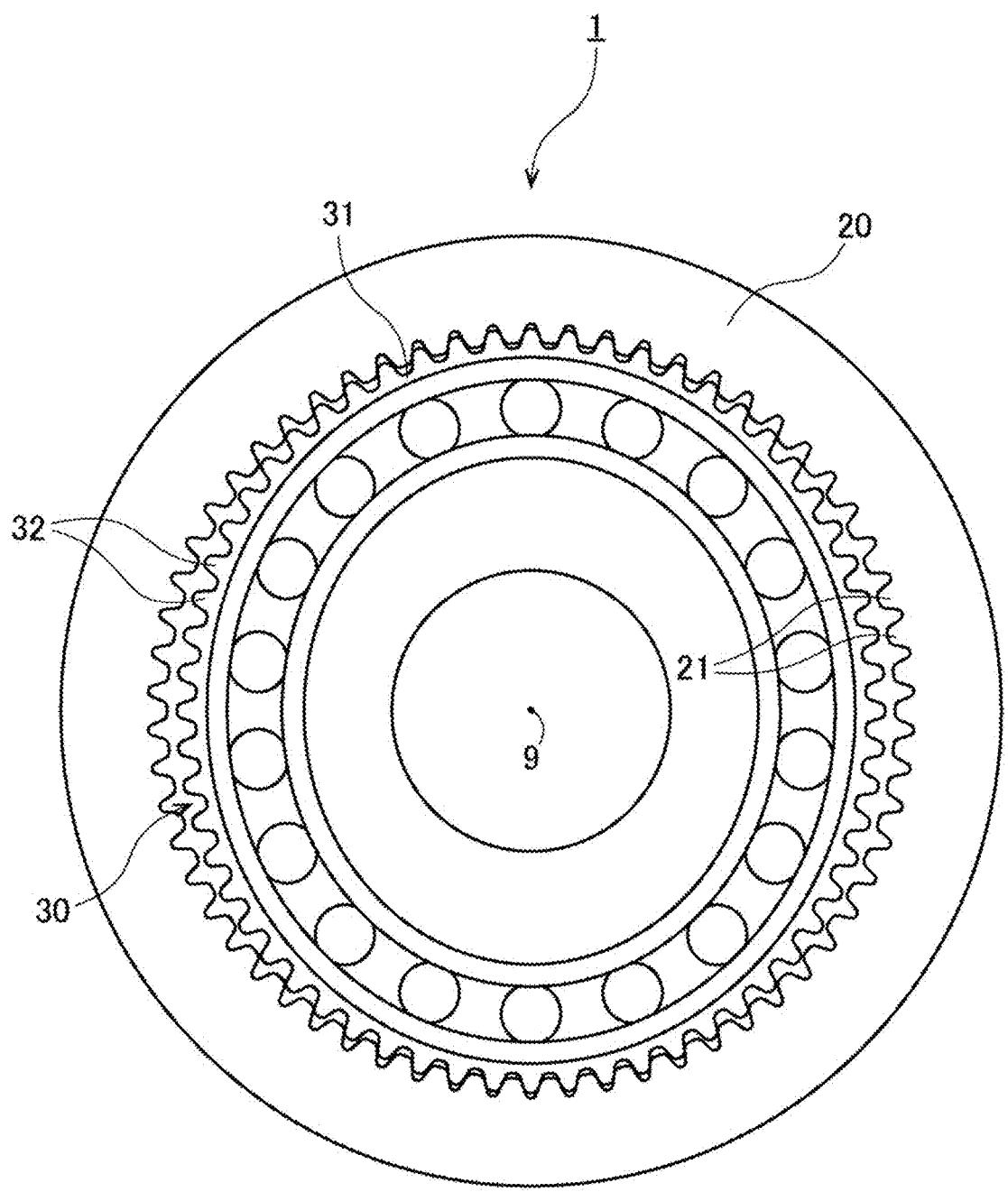
FIG. 3 is a transverse cross-sectional view of the power transmission device as viewed from position A-A in FIG. 2.

FIG. 2 is a longitudinal cross-sectional view of the power transmission device 1 according to the example embodiment. FIG. 3 is a transverse cross-sectional view of the power transmission device 1 as viewed from position A-A in FIG. 2. To avoid complication of the drawings, hatching that indicates a cross section is not shown in FIG. 3.

This power transmission device 1 is a wave reducer. The power transmission device 1 decelerates the rotational motion at a first rotational speed obtained from the motor 103 to a second rotational speed slower than the first rotational speed. As shown in FIGS. 2 and 3, the power transmission device 1 includes an internally toothed gear 20, an externally toothed gear 30, and a wave generator 40. The power transmission device 1 of the present example embodiment further includes an input shaft 10.

The input shaft 10 is a member that rotates at the first rotational speed before deceleration. The input shaft 10 is connected to an output shaft of the motor 103. The input shaft 10 extends in the axial direction along the central axis 9. The input shaft 10 of the present example embodiment has a cylindrical shape about the central axis 9. The input shaft 10 penetrates the power transmission device 1 in the axial direction. Note that the input shaft 10 may be the same member as the output shaft of the motor 103.

The internally toothed gear 20 is a machine component that rotates at the second rotational speed lower than the first rotational speed with the rotation of the input shaft 10. The internally toothed gear 20 is fixed with respect to the arm 102. The internally toothed gear 20 is arranged radially outside an external tooth 32 described later. The rigidity of the internally toothed gear 20 is sufficiently higher than the rigidity of a barrel portion 31 described later of the externally toothed gear The internally toothed gear 20 has an annular shape about the central axis 9. The internally toothed gear 20 has a plurality of internal teeth 21. The plurality of internal teeth 21 protrude radially inward from the radially inner surface of the internally toothed gear 20. The plurality of internal teeth 21 are arrayed at a constant pitch in the circumferential direction on the inner peripheral surface of the internally toothed gear 20.

The externally toothed gear 30 is an annular machine component that can be flexurally deformed. The externally toothed gear 30 is fixed with respect to the base frame 101. As shown in FIGS. 2 and 3, the externally toothed gear 30 includes the barrel portion 31, a plurality of the external teeth 32, a base portion 33, and a thick portion 34.

The barrel portion 31 is a cylindrical portion about the central axis 9. One end in the axial direction of the barrel portion 31 is connected to the base portion 33. The barrel portion 31 extends from the radially inner end portion of the base portion 33 toward the other side in the axial direction. The end portion on the other side in the axial direction of the barrel portion 31 is positioned radially outside the wave generator 40 and radially inside the internally toothed gear 20. Since the barrel portion 31 has flexibility, it can be flexurally deformed in the radial direction.

The plurality of external teeth 32 protrude radially outward from the radially outer surface of the barrel portion 31. The plurality of external teeth 32 are arranged on the radially outer surface of the other end in the axial direction of the barrel portion 31. The plurality of external teeth 32 are arrayed at a constant pitch in the circumferential direction. A part of the plurality of external teeth 32 and a part of the plurality of internal teeth 21 described above mesh with each other. The number of the internal teeth 21 of the internally toothed gear 20 is slightly different from the number of the external teeth 32 of the externally toothed gear 30.

The base portion 33 surrounds the central axis 9 and expands in a direction intersecting the central axis 9. The base portion 33 preferably expands along a plane orthogonal to the central axis 9. The base portion 33 expands radially outward from one end in the axial direction of the barrel portion 31. The base portion 33 has an annular shape surrounding the central axis 9. Since the base portion 33 is thin, it can be slightly flexurally deformed.

The thick portion 34 is an annular portion positioned radially outside the base portion 33. The thickness in the axial direction of the thick portion 34 is larger than the thickness in the axial direction of the base portion 33. The thick portion 34 is fixed to the base frame 101 directly or via another member.

The wave generator 40 is a mechanism that generates cyclic flexural deformation of the externally toothed gear 30. The wave generator 40 is arranged radially inside the external teeth 32. The wave generator 40 has a cam 41 and a flexible bearing 42. In the present example embodiment, the input shaft 10 and the cam 41 are formed of a single component. However, the cam 41 may be a separate component from the input shaft 10. In that case, the cam 41 may be fixed to the input shaft 10. The cam 41 is a component that applies displacement to the externally toothed gear 30 at a cycle of 180°. The radially outer surface of the cam 41 has an elliptical shape about the central axis 9.

The flexible bearing 42 is a bearing that can be flexurally deformed. The flexible bearing 42 is arranged between the radially outer surface of the cam 41 and the radially inner surface of the barrel portion 31 of the externally toothed gear An inner ring of the flexible bearing 42 contacts the radially outer surface of the cam 41. An outer ring of the flexible bearing 42 contacts the radially inner surface of the barrel portion 31. Therefore, the barrel portion 31 is deformed into an elliptical shape along the radially outer surface of the cam 41. As a result, the external teeth 32 of the externally toothed gear 30 and the internal teeth 21 of the internally toothed gear 20 mesh with each other at two positions corresponding to both ends of the major axis of the ellipse. At other positions in the circumferential direction, the external teeth 32 and the internal teeth 21 do not mesh with each other.

When the motor 103 is driven, together with the input shaft 10, the cam 41 rotates at the first rotational speed about the central axis 9. Due to this, the major axis of the ellipse described above of the externally toothed gear 30 also rotates at the first rotational speed. Then, the meshing position between the external teeth 32 and the internal teeth 21 also changes at the first rotational speed in the circumferential direction. As described above, the number of the internal teeth 21 of the internally toothed gear 20 is slightly different from the number of the external teeth 32 of the externally toothed gear 30. Due to this difference in the number of teeth, the meshing position between the external teeth 32 and the internal teeth 21 slightly changes in the circumferential direction every rotation of the cam 41. As a result, the internally toothed gear 20 rotates about the central axis 9 with respect to the externally toothed gear 30 at the second rotational speed slower than the first rotational speed.

Figure 4:
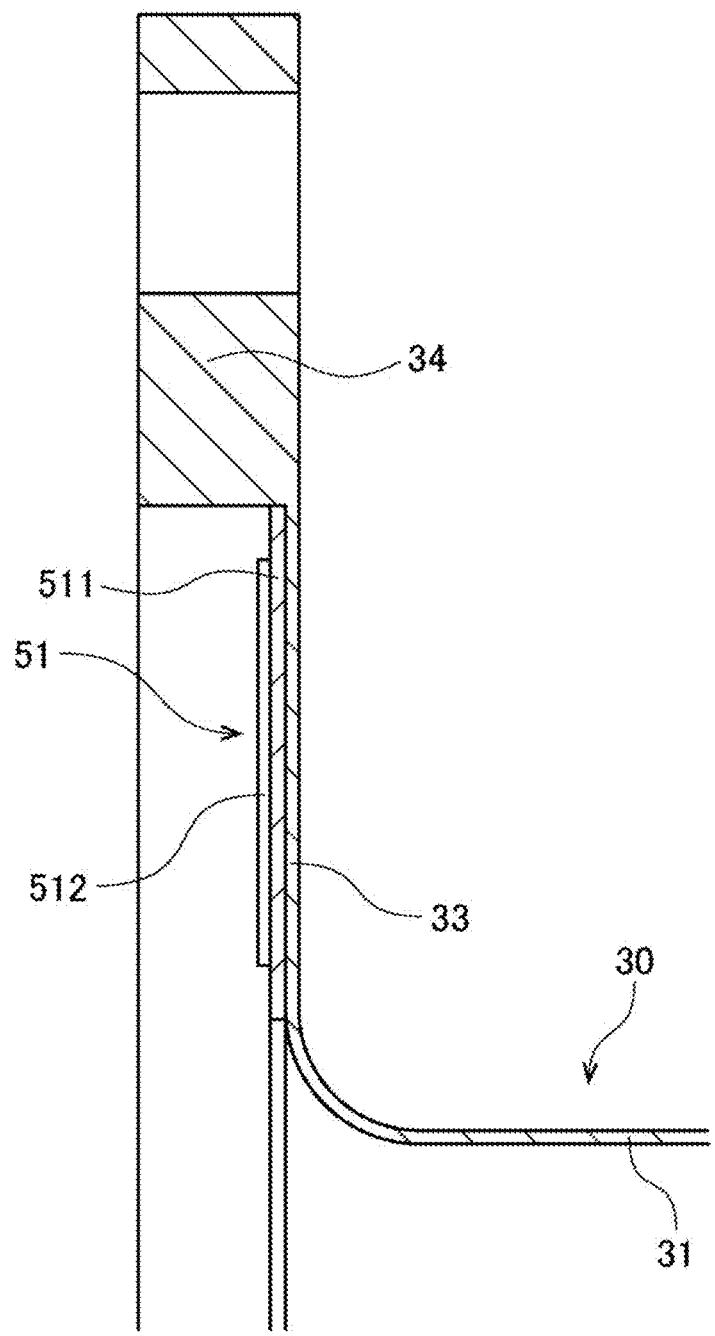
FIG. 4 is a partial longitudinal cross-sectional view of an externally toothed gear in the vicinity of a sensor board according to an example embodiment of the present application.
Figure 5:
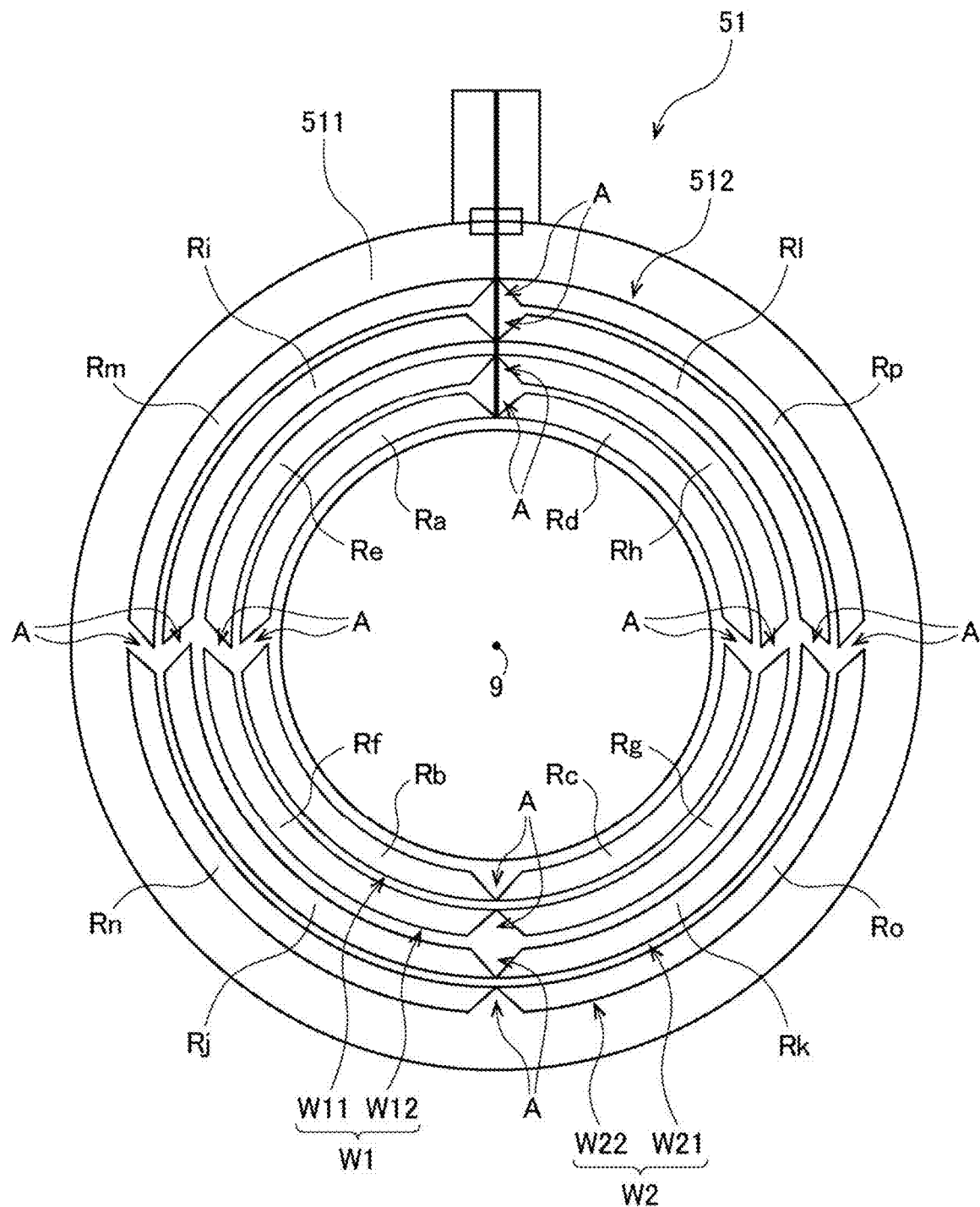
FIG. 5 is a plan view of the sensor board.

The power transmission device 1 includes a torque sensor The torque sensor 50 is a sensor for detecting the torque applied to the base portion 33 of the externally toothed gear 30 described above. As shown in FIG. 2, the torque sensor 50 includes a sensor board 51. The sensor board 51 is fixed onto the surface of the base portion 33. FIG. 4 is a partial longitudinal cross-sectional view of the externally toothed gear 30 in the vicinity of the sensor board 51. FIG. 5 is a plan view of the sensor board 51. As shown in FIGS. 4 and 5, the sensor board 51 includes an insulation layer 511 and a conductor layer 512.

The insulation layer 511 is flexibly deformable. The insulation layer 511 expands in a direction intersecting the central axis 9. The insulation layer 511 has an annular shape about the central axis 9. The insulation layer 511 is made of a resin or an inorganic insulating material that is an insulator. The insulation layer 511 is arranged on the surface of the base portion 33.

The conductor layer 512 is formed on the surface of the insulation layer 511. As a material of the conductor layer 512, a conductor metal is used. As a material of the conductor layer 512, for example, a copper alloy, a chromium alloy, or copper is used. As shown in FIG. 5, the conductor layer 512 includes a plurality of first strain gauges W1 and a plurality of second strain gauges W2. The plurality of second strain gauges W2 are arranged radially outside relative to the plurality of first strain gauges W1.

The plurality of first strain gauges W1 include a plurality of inner strain gauges W11 and a plurality of outer strain gauges W12. The plurality of outer strain gauges W12 are arranged radially outside relative to the plurality of inner strain gauges W11.

The inner strain gauges W11 include four strain gauges Ra, Rb, Rc, and Rd. The four strain gauges Ra, Rb, Rc, and Rd are arranged at intervals in the circumferential direction. The four strain gauges Ra, Rb, Rc, and Rd are provided in an arc shape in a range of about 90° about the central axis 9. The four strain gauges Ra, Rb, Rc, and Rd are arranged concentrically. The radial distances from the central axis 9 to the four strain gauges Ra, Rb, Rc, and Rd are substantially the same.

Figure 6:
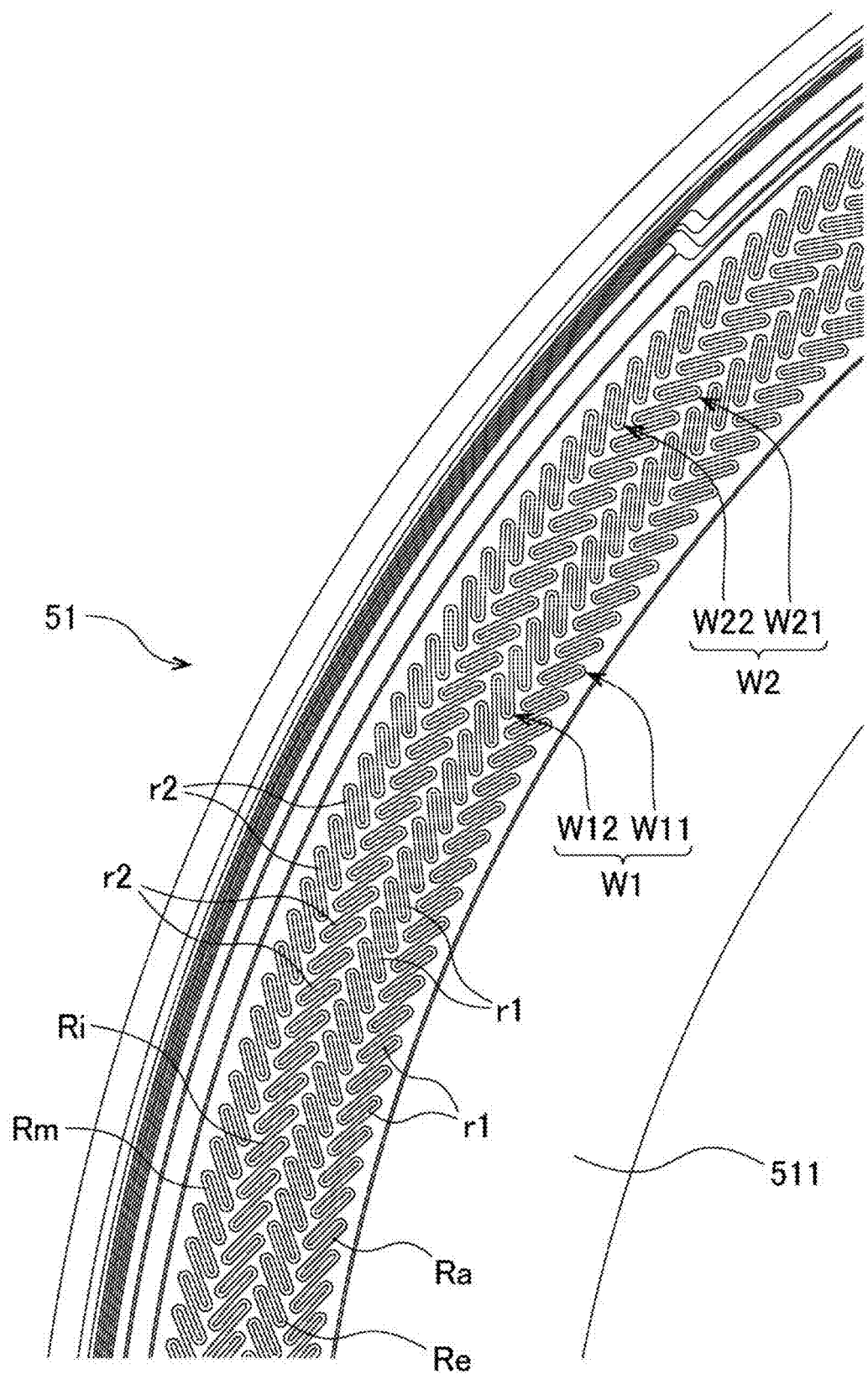
FIG. 6 is a partial plan view of the sensor board.

FIG. 6 is a partial plan view of the sensor board 51. In FIG. 6, as representatively shown for the strain gauge Ra, each of the four strain gauges Ra, Rb, Rc, and Rd has a plurality of resistance lines r1. The resistance line r1 extends in a direction having both radial and circumferential components. The plurality of resistance lines r1 are arrayed in the circumferential direction in a posture substantially parallel to one another. Among the four strain gauges Ra, Rb, Rc, and Rd, the resistance lines r1 of the two strain gauges Ra and Rb are inclined to one side in the circumferential direction with respect to the radial direction. The resistance lines r1 of the other two strain gauges Rc and Rd are inclined to the other side in the circumferential direction with respect to the radial direction. The inclination angle of the resistance line r1 with respect to the radial direction is, for example, 45°. The end portions of the resistance lines r1 adjacent to each other in the circumferential direction are alternately connected radially inside or radially outside. Due to this, the plurality of resistance lines r1 are connected in series as a whole.

The outer strain gauges W12 include four strain gauges Re, Rf, Rg, and Rh. The four strain gauges Re, Rf, Rg, and Rh are arranged at intervals in the circumferential direction. The four strain gauges Re, Rf, Rg, and Rh are provided in an arc shape in a range of about 90° about the central axis 9. The four strain gauges Re, Rf, Rg, and Rh are arranged concentrically. The radial distances from the central axis 9 to the four strain gauges Re, Rf, Rg, and Rh are substantially the same.

In FIG. 6, as representatively shown for the strain gauge Re, each of the four strain gauges Re, Rf, Rg, and Rh has the plurality of resistance lines r1. The resistance line r1 extends in a direction having both radial and circumferential components. The plurality of resistance lines r1 are arrayed in the circumferential direction in a posture substantially parallel to one another. Among the four strain gauges Re, Rf, Rg, and Rh, the resistance lines r1 of the two strain gauges Rg and Rh are inclined to one side in the circumferential direction with respect to the radial direction. The resistance lines r1 of the other two strain gauges Re and Rf are inclined to the other side in the circumferential direction with respect to the radial direction. The inclination angle of the resistance line r1 with respect to the radial direction is, for example, 45°. The end portions of the resistance lines r1 adjacent to each other in the circumferential direction are alternately connected radially inside or radially outside. Due to this, the plurality of resistance lines r1 are connected in series as a whole.

The plurality of second strain gauges W2 includes a plurality of inner strain gauges W21 and a plurality of outer strain gauges W22. The plurality of outer strain gauges W22 are arranged radially outside relative to the plurality of inner strain gauges W21.

The inner strain gauges W21 include four strain gauges Ri, Rj, Rk, and Rl. The four strain gauges Ri, Rj, Rk, and Rl are arranged at intervals in the circumferential direction. The four strain gauges Ri, Rj, Rk, and Rl are provided in an arc shape in a range of about 90° about the central axis 9. The four strain gauges Ri, Rj, Rk, and Rl are arranged concentrically. The radial distances from the central axis 9 to the four strain gauges Ri, Rj, Rk, and Rl are substantially the same.

As shown in FIG. 6, each of the four strain gauges Ri, Rj, Rk, and Rl includes a plurality of resistance lines r2. The resistance line r2 extends in a direction having both radial and circumferential components. The plurality of resistance lines r2 are arrayed in the circumferential direction in a posture substantially parallel to one another. Among the four strain gauges Ri, Rj, Rk, and Rl, the resistance lines r2 of the two strain gauges Ri and Rj are inclined to one side in the circumferential direction with respect to the radial direction. The resistance lines r2 of the other two strain gauges Rk and Rl are inclined to the other side in the circumferential direction with respect to the radial direction. The inclination angle of the resistance line r2 with respect to the radial direction is, for example, 45°. The end portions of the resistance lines r2 adjacent to each other in the circumferential direction are alternately connected radially inside or radially outside. Due to this, the plurality of resistance lines r2 are connected in series as a whole.

The outer strain gauges W22 include four strain gauges Rm, Rn, Ro, and Rp. The four strain gauges Rm, Rn, Ro, and Rp are arranged at intervals in the circumferential direction. The four strain gauges Rm, Rn, Ro, and Rp are provided in an arc shape in a range of about 90° about the central axis 9. The four strain gauges Rm, Rn, Ro, and Rp are arranged concentrically. The radial distances from the central axis 9 to the four strain gauges Rm, Rn, Ro, and Rp are substantially the same.

As shown in FIG. 6, each of the four strain gauges Rm, Rn, Ro, and Rp includes the plurality of resistance lines r2. The resistance line r2 extends in a direction having both radial and circumferential components. The plurality of resistance lines r2 are arrayed in the circumferential direction in a posture substantially parallel to one another. Among the four strain gauges Rm, Rn, Ro, and Rp, the resistance lines r2 of the two strain gauges Ro and Rp are inclined to one side in the circumferential direction with respect to the radial direction. The resistance lines r2 of the other two strain gauges Rm and Rn are inclined to the other side in the circumferential direction with respect to the radial direction.

The inclination angle of the resistance line r2 with respect to the radial direction is, for example, 45°. The end portions of the resistance lines r2 adjacent to each other in the circumferential direction are alternately connected radially inside or radially outside. Due to this, the plurality of resistance lines r2 are connected in series as a whole.

The inclination angles of the resistance lines r1 and r2 with respect to the radial direction may be other than 45°. For example, the inclination angles of the resistance lines r1 and r2 with respect to the radial direction may be 30° or 60°.

Figure 7:
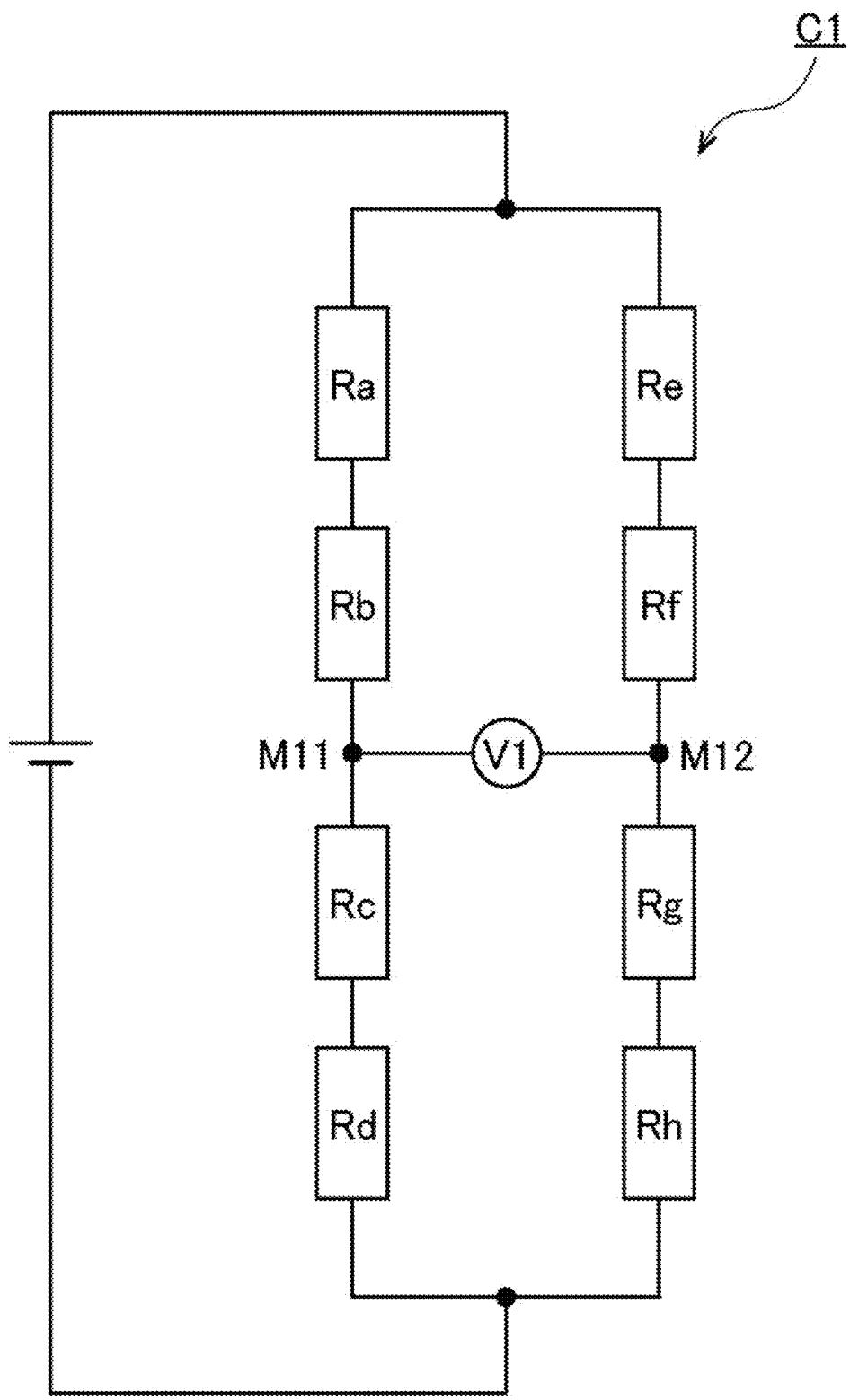
FIG. 7 is a circuit diagram of a first bridge circuit according to an example embodiment of the present application.

The plurality of first strain gauges W1 constitute a first bridge circuit C1. That is, the plurality of inner strain gauges W11 and the plurality of outer strain gauges W12 constitute the first bridge circuit C1. By configuring the first bridge circuit C1 with the plurality of inner strain gauges W11 and the plurality of outer strain gauges W12, it is possible to accurately detect the torque applied to the base portion 33. FIG. 7 is a circuit diagram of the first bridge circuit C1. As shown in FIG. 7, the first bridge circuit C1 is configured by connecting the eight strain gauges Ra, Rb, Rc, Rd, Re, Rf, Rg, and Rh to one another.

The four strain gauges Ra, Rb, Rc, and Rd are connected in series in this order. The four strain gauges Re, Rf, Rg, and Rh are connected in series in this order. A row of the four strain gauges Ra, Rb, Rc, and Rd and a row of the four strain gauges Re, Rf, Rg, and Rh are connected in parallel between the positive pole and the negative pole of the power supply voltage. A first voltmeter V1 is connected between a midpoint M11 between the two strain gauges Rb and Rc and a midpoint M12 between the two strain gauges Rf and Rg.

The resistance value of each resistance line r1 of the eight strain gauges Ra, Rb, Rc, Rd, Re, Rf, Rg, and Rh changes according to the torque applied to the base portion 33. For example, when the base portion 33 is applied with torque directed toward one side in the circumferential direction about the central axis 9, the resistance value of each resistance line r1 of the four strain gauges Ra, Rb, Rg, and Rh decreases, and the resistance value of each resistance line r1 of the other four strain gauges Rc, Rd, Re, and Rf increases. On the other hand, when the base portion 33 is applied with torque directed toward the other side in the circumferential direction about the central axis 9, the resistance value of each resistance line r1 of the four strain gauges Ra, Rb, Rg, and Rh increases, and the resistance value of each resistance line r1 of the other four strain gauges Rc, Rd, Re, and Rf decreases. In this manner, the four strain gauges Ra, Rb, Rg, and Rh and the other four strain gauges Rc, Rd, Re, and Rf exhibit resistance value changes in orientations opposite to each other with respect to the torque.

When the resistance values of the four strain gauges Ra, Rb, Rg, and Rh and the resistance values of the other four strain gauges Rc, Rd, Re, and Rf change in opposite orientations, the potential difference between the midpoint M11 of the two strain gauges Rb and Rc and the midpoint M12 of the two strain gauges Rf and Rg changes, and thus the measurement value of the first voltmeter V1 also changes. Therefore, the orientation and the magnitude of the torque applied to the base portion 33 can be detected based on the measurement value of this first voltmeter V1.

Figure 8:
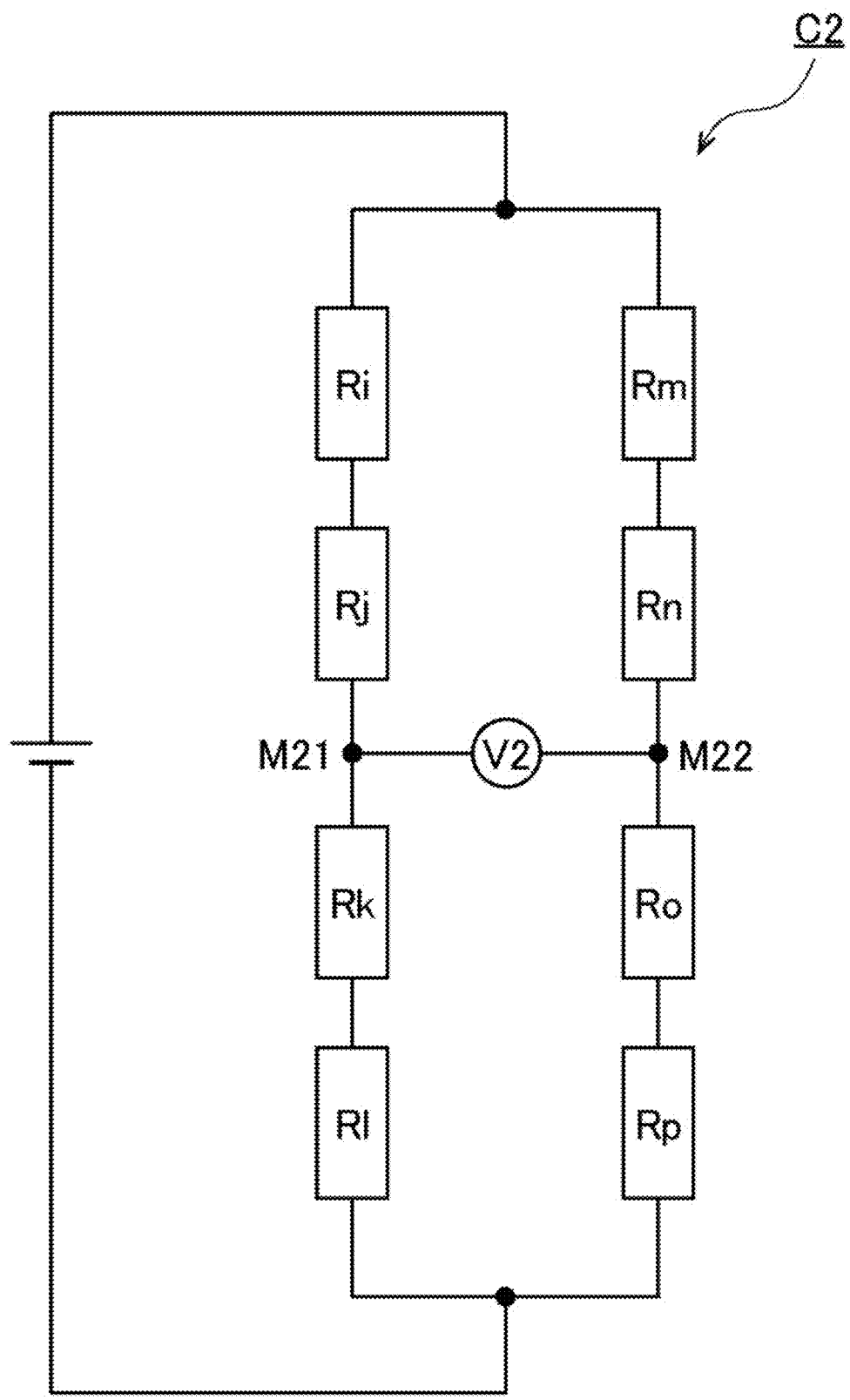
FIG. 8 is a circuit diagram of a second bridge circuit according to an example embodiment of the present application.

The plurality of second strain gauges W2 constitute a second bridge circuit C2. That is, the plurality of inner strain gauges W21 and the plurality of outer strain gauges W22 constitute the second bridge circuit C2. By configuring the second bridge circuit C2 with the plurality of inner strain gauges W21 and the plurality of outer strain gauges W22, it is possible to accurately detect the torque applied to the base portion 33. FIG. 8 is a circuit diagram of the second bridge circuit C2. As shown in FIG. 8, the second bridge circuit C2 is configured by connecting eight strain gauges Ri, Rj, Rk, Rl, Rm, Rn, Ro, and Rp to one another.

The four strain gauges Ri, Rj, Rk, and Rl are connected in series in this order. The four strain gauges Rm, Rn, Ro, and Rp are connected in series in this order. A row of the four strain gauges Ri, Rj, Rk, and Rl and a row of the four strain gauges Rm, Rn, Ro, and Rp are connected in parallel between the positive pole and the negative pole of the power supply voltage. A second voltmeter V2 is connected between a midpoint M21 between the two strain gauges Rj and Rk and a midpoint M22 between the two strain gauges Rn and Ro.

The resistance value of each resistance line r2 of the eight strain gauges Ri, Rj, Rk, Rl, Rm, Rn, Ro, and Rp changes according to the torque applied to the base portion 33. For example, when the base portion 33 is applied with torque directed toward one side in the circumferential direction about the central axis 9, the resistance value of each resistance line r2 of the four strain gauges Ri, Rj, Ro, and Rp decreases, and the resistance value of each resistance line r2 of the other four strain gauges Rk, Rl, Rm, and Rn increases. On the other hand, when the base portion 33 is applied with torque directed toward the other side in the circumferential direction about the central axis 9, the resistance value of each resistance line r2 of the four strain gauges Ri, Rj, Ro, and Rp increases, and the resistance value of each resistance line r2 of the other four strain gauges Rk, Rl, Rm, and Rn decreases. In this manner, the four strain gauges Ri, Rj, Ro, and Rp and the other four strain gauges Rk, Rl, Rm, and Rn exhibit resistance value changes in orientations opposite to each other with respect to the torque.

When the resistance values of the four strain gauges Ri, Rj, Ro, and Rp and the resistance values of the other four strain gauges Rk, Rl, Rm, and Rn change in opposite orientations, the potential difference between the midpoint M21 of the two strain gauges Rj and Rk and the midpoint M22 of the two strain gauges Rn and Ro changes, and thus the measurement value of the second voltmeter V2 also changes. Therefore, the orientation and the magnitude of the torque applied to the base portion 33 can be detected based on the measurement value of this second voltmeter V2.

The power transmission device 1 further includes a housing 60 and a signal processing board 70. As shown in FIG. 2, the housing 60 is positioned on one side in the axial direction of the externally toothed gear 30. The housing 60 covers the externally toothed gear 30 from one side in the axial direction. The housing 60 is fixed with respect to the externally toothed gear 30.

The signal processing board 70 is fixed onto the surface of the housing 60. The signal processing board 70 includes an electric circuit including a microprocessor. The signal processing board 70 is electrically connected to the first bridge circuit C1 and the second bridge circuit C2. The signal processing board 70 detects the torque applied to the base portion 33 based on the output signals of the first voltmeter V1 and the second voltmeter V2.

In particular, the torque sensor 50 of the present example embodiment includes the plurality of first strain gauges W1 defining the first bridge circuit C1 and the plurality of second strain gauges W2 defining the second bridge circuit C2. Therefore, even when an abnormality occurs in any one of the bridge circuits, the other bridge circuit can detect torque.

As described above, in the present example embodiment, the externally toothed gear 30, which is a machine component, includes the plurality of strain gauges Ra, Rb, Rc, Rd, Re, Rf, Rg, Rh, Ri, Rj, Rk, Rl, Rm, Rn, Ro, and Rp. The plurality of strain gauges Ra, Rb, Rc, Rd, Re, Rf, Rg, Rh, Ri, Rj, Rk, Rl, Rm, Rn, Ro, and Rp are arranged in the base portion 33.

The four strain gauges Ra, Rb, Rc, and Rd are arrayed in the circumferential direction about the central axis 9. A gap region A is arranged between adjacent strain gauges in the circumferential direction. Four gap regions A are arranged at an angular interval of 90° about the central axis 9.

The four strain gauges Re, Rf, Rg, and Rh are arrayed in the circumferential direction about the central axis 9. A gap region A is arranged between adjacent strain gauges in the circumferential direction. Four gap regions A are arranged at an angular interval of 90° about the central axis 9.

The four strain gauges Ri, Rj, Rk, and Rl are arrayed in the circumferential direction about the central axis 9. A gap region A is arranged between adjacent strain gauges in the circumferential direction. Four gap regions A are arranged at an angular interval of 90° about the central axis 9.

The four strain gauges Rm, Rn, Ro, and Rp are arrayed in the circumferential direction about the central axis 9. A gap region A is arranged between adjacent strain gauges in the circumferential direction. Four gap regions A are arranged at an angular interval of 90° about the central axis 9.

The externally toothed gear 30 is flexurally deformed by the elliptical cam 41. For this reason, not only the torque due to the external force originally desired to be measured but also the torque (hereinafter referred to as "ripple torque T") due to the flexural deformation by the cam 41 is generated in the externally toothed gear 30. The torque sensor 50 detects this ripple torque T together with the torque generated in the externally toothed gear 30 by the external force.

Figure 9:
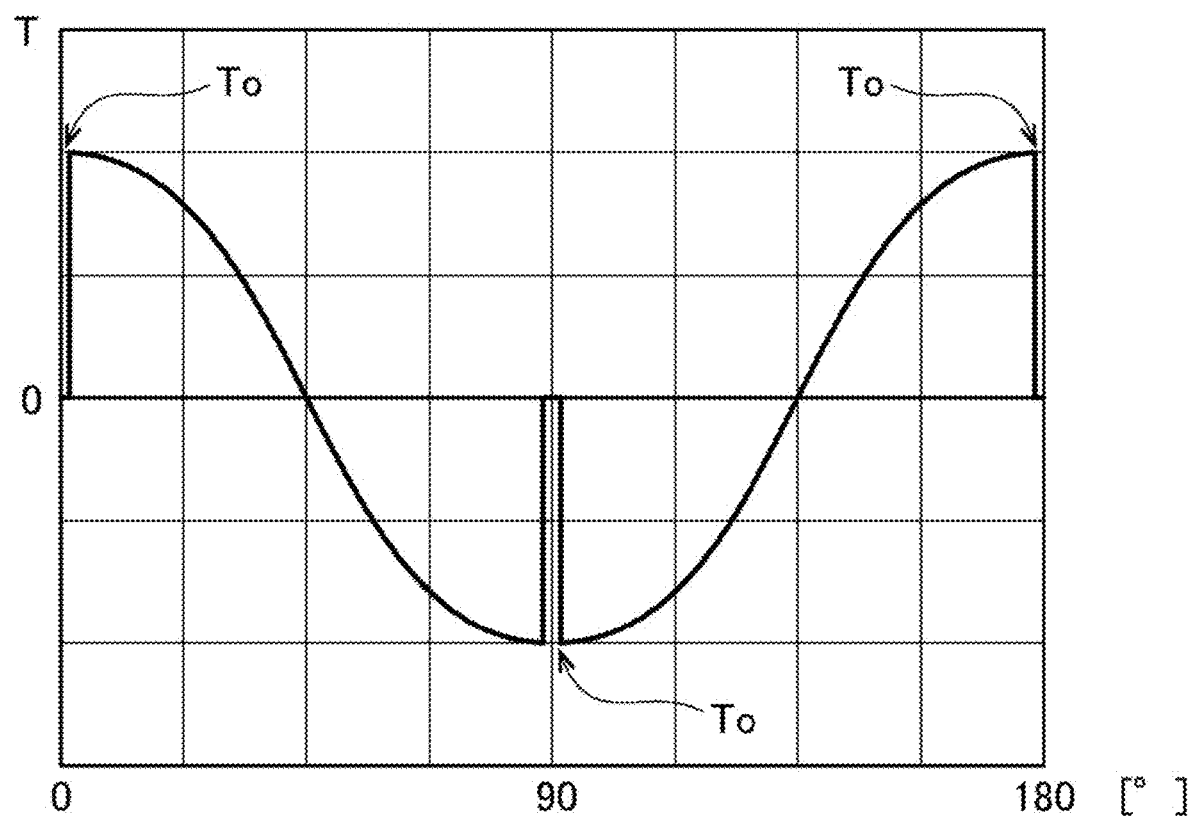
FIG. 9 is a graph showing ripple torque detected by a torque sensor according to an example embodiment of the present application.

FIG. 9 is a graph showing the ripple torque T detected by the torque sensor 50 at a certain time point. The horizontal axis in FIG. 9 indicates the position in the circumferential direction about the central axis 9. The vertical axis in FIG. 9 indicates the value of the ripple torque T detected by the torque sensor 50. In the present example embodiment, since the diameter of the radially outer surface of the cam 41 changes at an angular cycle of 180° about the central axis 9, the ripple torque T also appears sinusoidally at an angular cycle of 180° about the central axis 9 as shown in FIG. 9.

Then, the value obtained by integrating the ripple torque T in FIG. 9 in the range of 0° to 180° is the total value of the ripple torque T detected by the torque sensor 50 at the position of 0° to 180° in the circumferential direction at that time point.

However, as shown in FIG. 9, the ripple torque T detected by the torque sensor 50 has a detection loss To. The detection loss To occurs at an angular position corresponding to the gap region A of the strain gauge. That is, since there is no strain gauge in the gap region A, the ripple torque T cannot be detected, and the detection loss To occurs. When the cam 41 rotates, the waveform of the sinusoidal ripple torque T in FIG. 9 moves in the horizontal axis direction, but the position of the detection loss To does not change. This detection loss To can be an error component of the above-described integral value of the ripple torque T.

In the present example embodiment, the gap regions A are arranged at an angular interval of 90°. In this way, the detection loss To caused by the gap region A also occurs at an angular interval of 90° as shown in FIG. 9. Therefore, in the ripple torque T of 180° cycle, the two detection losses To have opposite phases, and thus the detection losses To cancel each other when integrated. As a result, an error caused by the detection loss To can be reduced in the integral value of the ripple torque T.

Figure 10:
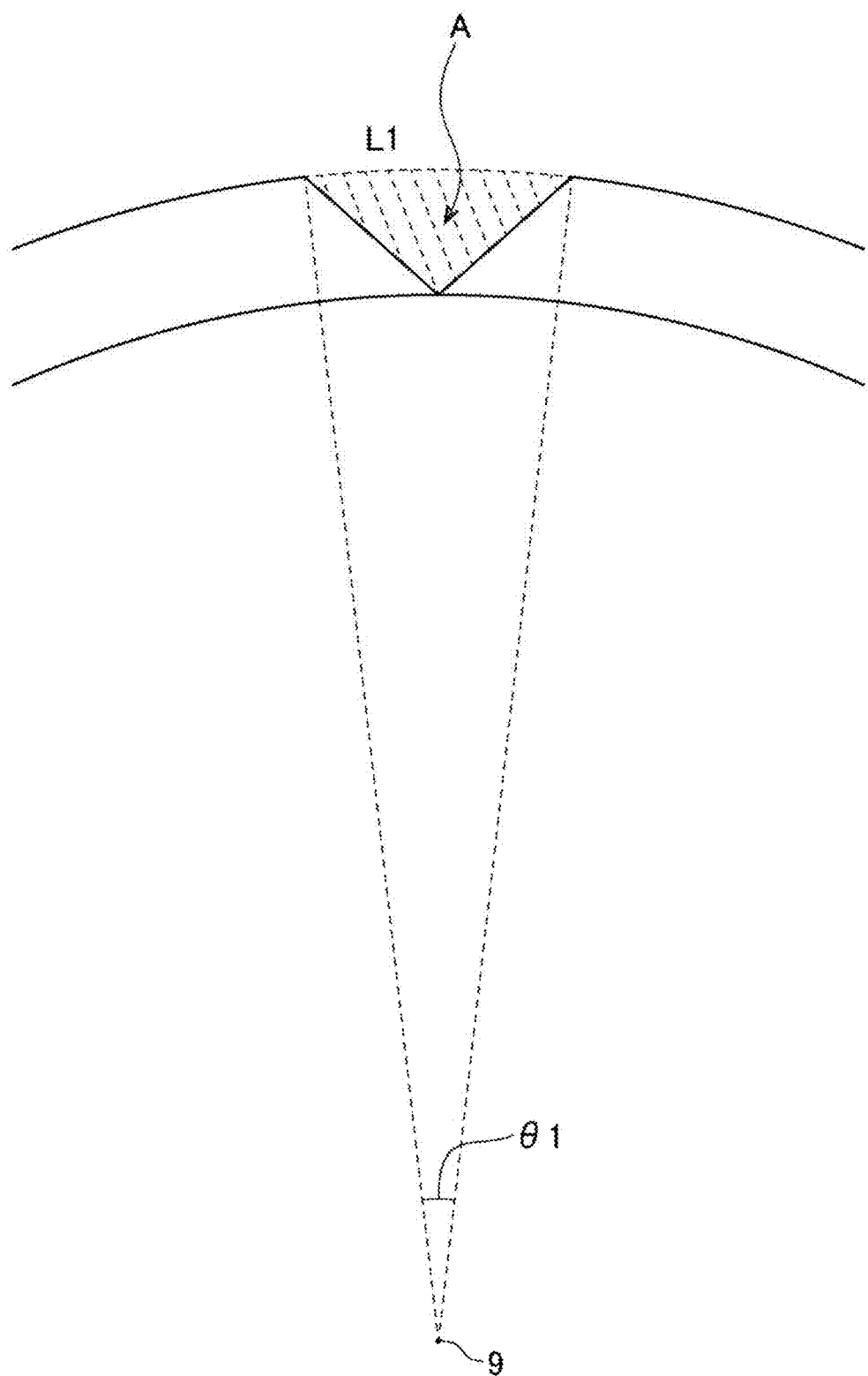
FIG. 10 is an enlarged view of a gap region according to an example embodiment of the present application.
Figure 11:
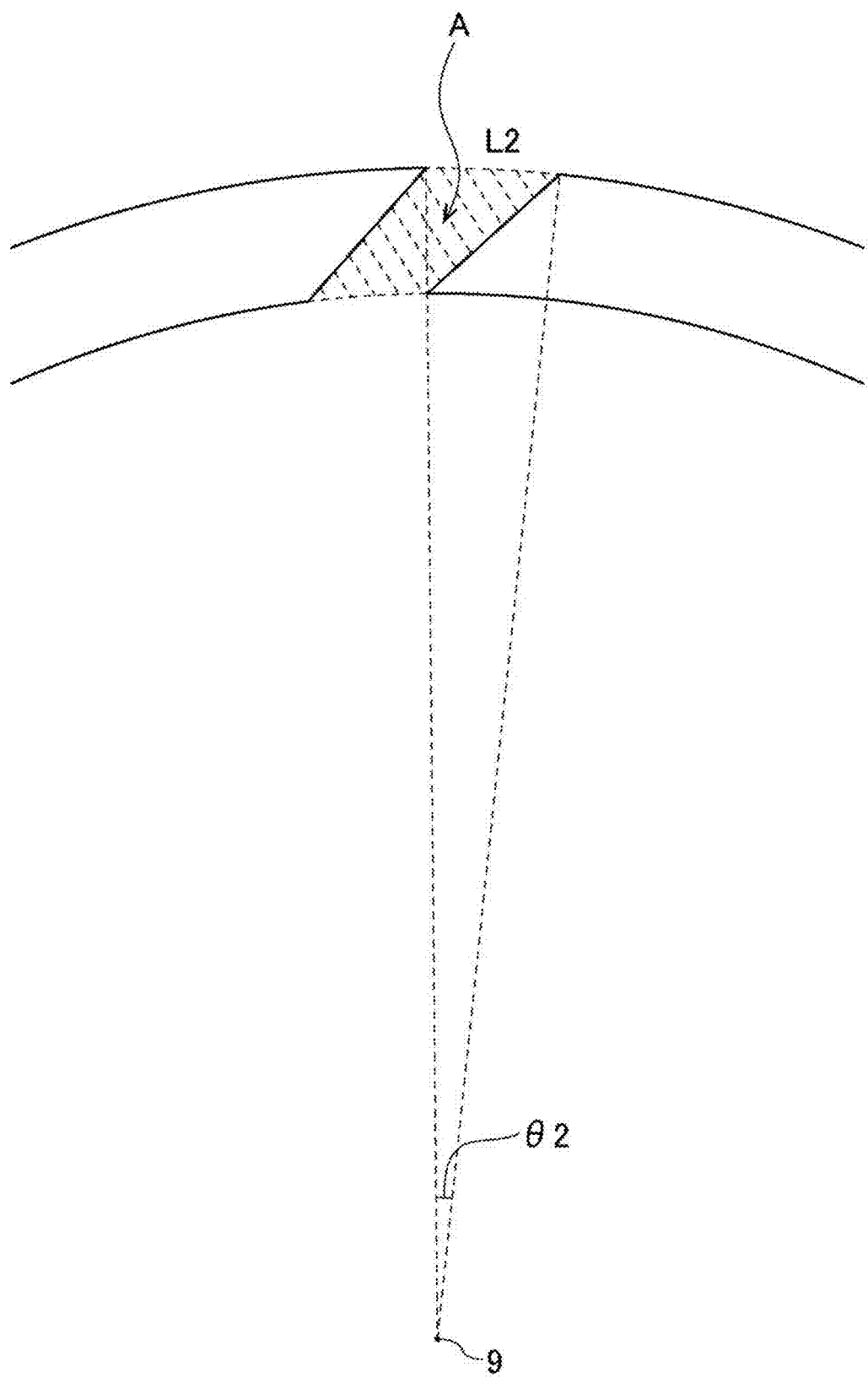
FIG. 11 is an enlarged view of a gap region according to an example embodiment of the present application.

FIGS. 10 and 11 are enlarged views of the gap region A. In FIGS. 10 and 11, the gap region A is indicated by broken line hatching. As in FIGS. 10 and 11, in the present example embodiment, there are two types of shapes of the gap region A depending on the inclination of the resistance lines of adjacent strain gauges. A maximum length L1 in the circumferential direction of the gap region A in FIG. 10 is twice a maximum length L2 in the circumferential direction of the gap region A in FIG. 11. A maximum central angle θ1 of the gap region A in FIG. 10 is twice a maximum central angle θ2 of the gap region A in FIG. 11.

However, regardless of the shape of the gap region A, the areas of the plurality of gap regions A are equal to one another. This can equalize the loss amount of the ripple torque T due to the gap region A. This can further reduce an error caused by the detection loss To in the integral value of the ripple torque T. The area of the gap region A is the area of a region existing between the strain gauges adjacent to each other in the circumferential direction and between an extension line of a radially inner edge of the strain gauge and an extension line of a radially outer edge of the strain gauge in the radial direction.

The areas of the plurality of gap regions A may have an inevitably generated error. That is, the areas of the plurality of gap regions A may be substantially the same.

In particular, in the present example embodiment, the areas of the plurality of gap regions A in the plurality of first strain gauges W1 are equal to one another, and the areas of the plurality of gap regions A in the plurality of second strain gauges W2 are equal to one another. More specifically, the areas of the plurality of gap regions A in the plurality of inner strain gauges W11 included in the plurality of first strain gauges W1 are equal to one another. The areas of the plurality of gap regions A in the plurality of outer strain gauges W12 included in the plurality of first strain gauges W1 are equal to each other. The areas of the plurality of gap regions A in the plurality of inner strain gauges W21 included in the plurality of second strain gauges W2 are equal to each other. The areas of the plurality of gap regions A in the plurality of outer strain gauges W22 included in the plurality of second strain gauges W2 are equal to each other.

This can equalize the loss amount of the ripple torque T due to the gap region A in each of the first bridge circuit C1 and the second bridge circuit C2. This can further reduce an error in the output value due to the detection loss To in each of the first bridge circuit C1 and the second bridge circuit C2.

While the example embodiment of the present disclosure has been described above, the present disclosure is not limited to the above example embodiment. Hereinafter, various modifications will be described focusing on differences from the example embodiment.

Figure 12:
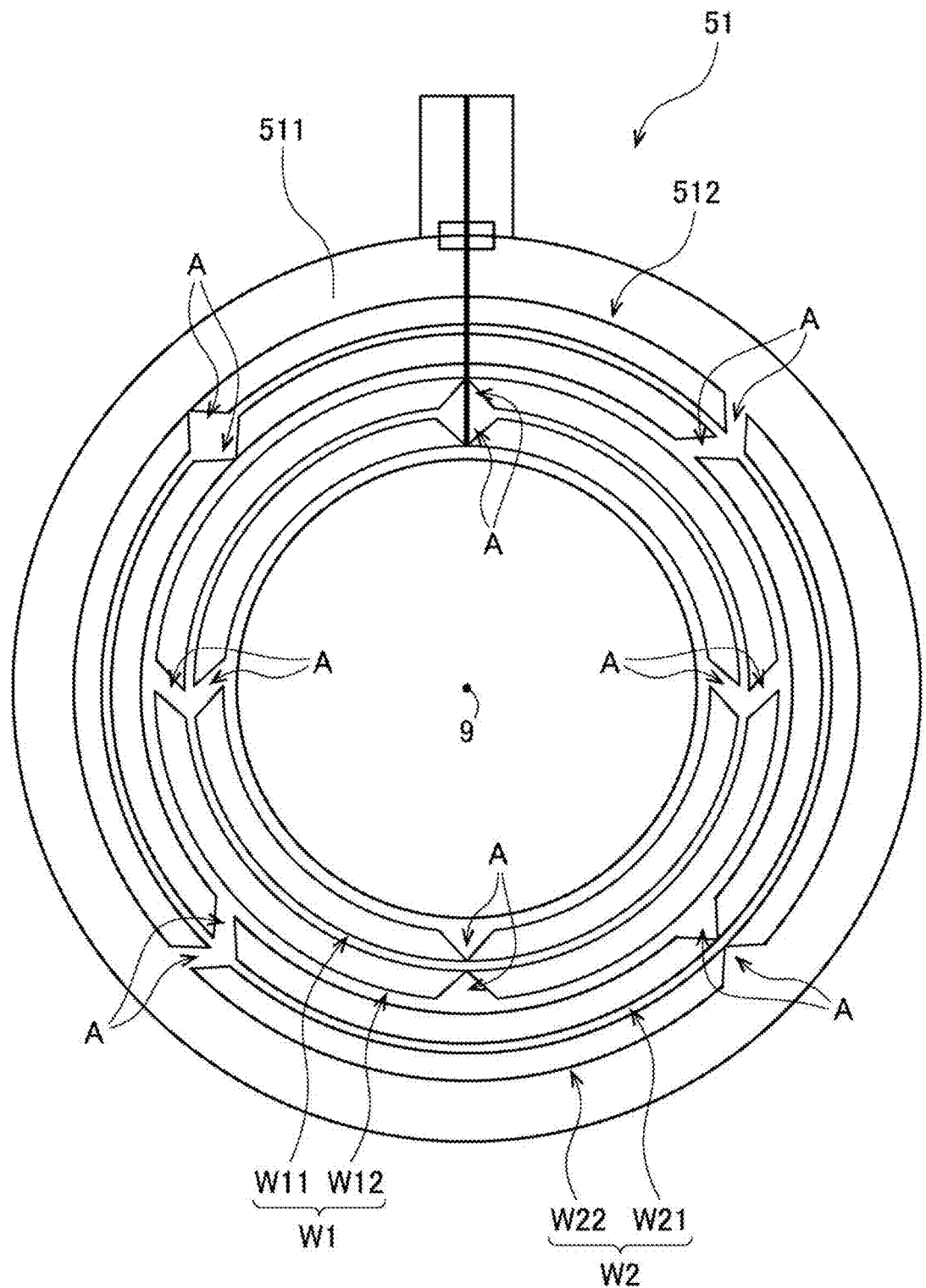
FIG. 12 is a plan view of a sensor board according to a first modification of an example embodiment of the present application.

FIG. 12 is a plan view of the sensor board 51 according to the first modification. In the above example embodiment, the circumferential positions of the plurality of gap regions A in the plurality of first strain gauges W1 and the circumferential positions of the plurality of gap regions A in the plurality of second strain gauges W2 are the same. On the other hand, in the example of FIG. 12, the circumferential positions of the plurality of gap regions A in the plurality of first strain gauges W1 and the circumferential positions of the plurality of gap regions A in the plurality of second strain gauges W2 are different.

Thus, the circumferential positions of the plurality of gap regions A in the plurality of first strain gauges W1 and the circumferential positions of the plurality of gap regions A in the plurality of second strain gauges W2 need not be the same. This enables use of two bridge circuits of the first bridge circuit C1 and the second bridge circuit C2, and improvement of the degree of freedom in arrangement of the plurality of strain gauges.

Figure 13:
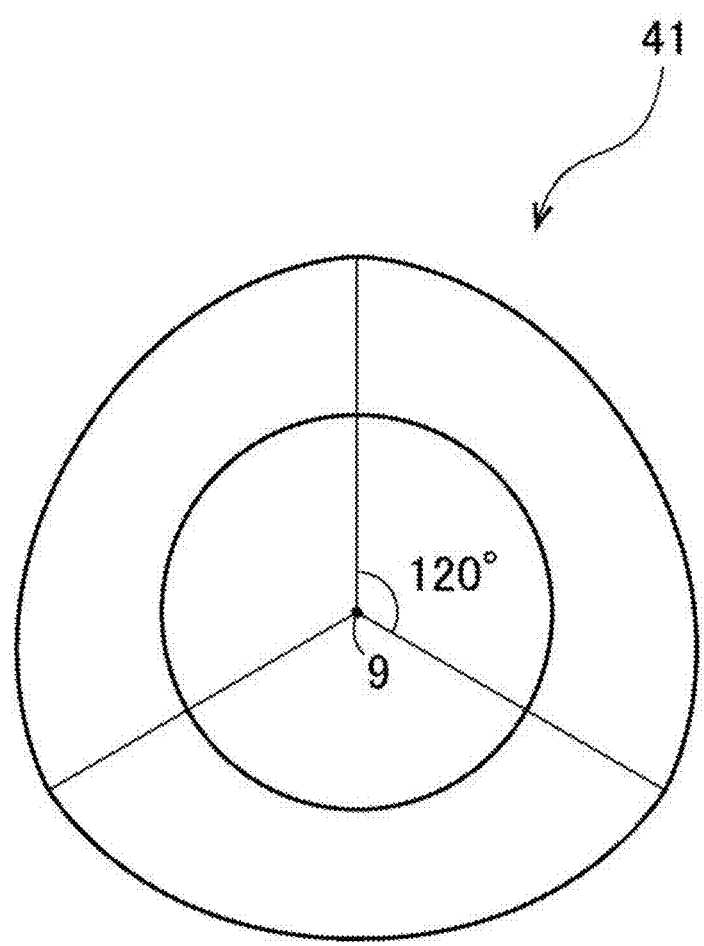
FIG. 13 is a plan view of a cam according to a second modification of an example embodiment of the present application.

FIG. 13 is a plan view of the cam 41 according to the second modification. In the above example embodiment, the radially outer surface of the cam 41 has an elliptical shape. For this reason, the diameter of the radially outer surface of the cam 41 changes at an angular cycle of 180° about the central axis 9. On the other hand, in the example of FIG. 13, the radially outer surface of the cam 41 has a substantially triangular shape with smoothly curved corners. For this reason, the diameter of the radially outer surface of the cam 41 changes at an angular cycle of 120° about the central axis 9. That is, the cam 41 in FIG. 13 is a component that applies displacement to the externally toothed gear 30 at a cycle of 120°. The power transmission device 1 may use such the cam 41 of FIG. 13 instead of the cam 41 of the above example embodiment.

Use of the cam 41 of FIG. 13 makes the ripple torque T change sinusoidally with an angular cycle of 120° about the central axis 9. In this case, the gap regions A may be arranged at angular intervals of 60° about the central axis 9. In this way, the detection loss To caused by the gap region A also occurs at an angular interval of 60°. Therefore, in the ripple torque T of 120° cycle, the two detection losses To have opposite phases, and thus the detection losses To cancel each other when integrated. As a result, an error caused by the detection loss To can be reduced in the integral value of the ripple torque T.

In the above example embodiment, the torque sensor 50 of the present example embodiment includes the plurality of first strain gauges W1 defining the first bridge circuit Cl and the plurality of second strain gauges W2 defining the second bridge circuit C2. However, the torque sensor 50 may include only any one of the plurality of first strain gauges W1 defining the first bridge circuit C1 and the plurality of second strain gauges W2 defining the second bridge circuit C2.

In the above example embodiment, the plurality of strain gauges are arranged on the externally toothed gear 30 which is a machine component. However, instead of the externally toothed gear 30, a plurality of strain gauges may be arranged on the internally toothed gear 20, which is another machine component. That is, the "machine component" in the present disclosure may be either the externally toothed gear 30 or the internally toothed gear 20. This can improve the degree of freedom in design of the power transmission device 1. That is, the strain gauge can be arranged to a preferable target of the externally toothed gear 30 or the internally toothed gear 20 in accordance with the specifications or design of the product equipped with the power transmission device 1.

In the power transmission device 1 of the above example embodiment, the externally toothed gear 30 is fixed to the base frame 101, and the internally toothed gear 20 rotates at the second rotational speed after deceleration. However, the internally toothed gear 20 may be fixed to the base frame 101, and the externally toothed gear 30 may rotate at the second rotational speed after deceleration.

The externally toothed gear 30 of the above example embodiment is what is called a "hat type" flexible externally toothed gear in which the base portion 33 expands radially outward from the barrel portion 31. However, the externally toothed gear 30 may be what is called a "cup type" flexible externally toothed gear in which the base portion 33 expands radially inward from the barrel portion 31.

In the above example embodiment, the power transmission device 1 equipped on the robot 100 has been described. However, the power transmission device 1 having a similar structure may be equipped on another device such as an assist suit or an automatic guided vehicle.

Other than that, detailed configurations of the machine component, the power transmission device, and the robot may be appropriately changed without departing from the gist of the present disclosure. The elements appearing in the above example embodiment and modifications may be appropriately combined as long as no contradiction occurs.

The present technology can have the following configurations.

(1) A machine component including: a base portion extending in a direction intersecting a central axis; and a plurality of strain gauges arranged on the base portion, in which the plurality of strain gauges are arrayed in a circumferential direction about the central axis, a plurality of gap regions are arranged between the strain gauges adjacent to each other in a circumferential direction, and the plurality of gap regions include gap regions arranged at angular intervals of 90° about the central axis.

(2) A machine component including: a base portion extending in a direction intersecting a central axis; and a plurality of strain gauges arranged on the base portion, in which the plurality of strain gauges are arrayed in a circumferential direction about the central axis, a plurality of gap regions are arranged between the strain gauges adjacent to each other in a circumferential direction, and the plurality of gap regions include gap regions arranged at angular intervals of 60° about the central axis.

(3) The machine component according to (1) or (2), in which areas of the plurality of gap regions are equal to one another.

(4) The machine component according to any one of (1) to (3), in which the plurality of strain gauges include a plurality of inner strain gauges arrayed circumferentially and a plurality of outer strain gauges arrayed circumferentially on a radially outer side relative to the plurality of inner strain gauges, and the plurality of inner strain gauges and the plurality of outer strain gauges constitute a bridge circuit.

(5) The machine component according to any one of (1) to (4), in which the plurality of strain gauges include a plurality of first strain gauges defining a first bridge circuit, and a plurality of second strain gauges arranged radially outside relative to the plurality of first strain gauges and defining a second bridge circuit.

(6) The machine component according to (5), in which areas of the plurality of gap regions in the plurality of first strain gauges are equal to one another, and areas of the plurality of gap regions in the plurality of second strain gauges are equal to one another.

(7) The machine component according to (5) or (6), in which circumferential positions of the plurality of gap regions in the plurality of first strain gauges and circumferential positions of the plurality of gap regions in the plurality of second strain gauges are different.

(8) A power transmission device including the machine component according to any one of (1) to (7), the power transmission device including: an internally toothed gear; an externally toothed gear meshing with the internally toothed gear; and a wave generator that generates cyclic flexure in the externally toothed gear, in which any one of the internally toothed gear and the externally toothed gear is the machine component.

(9) A robot including the power transmission device according to (8).

The present disclosure can be used for, for example, a machine component, a power transmission device, and a robot.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A power transmission device, comprising:
   a machine component including:
     a base portion extending in a direction intersecting a central axis; and
     a plurality of strain gauges provided on the base portion and arrayed in a circumferential direction about the central axis; wherein
   a plurality of gap regions are provided between the strain gauges adjacent to each other in a circumferential direction;
   the plurality of gap regions include gap regions aligned with one another at a same circumferential position about the central axis and arranged at angular intervals of 90° about the central axis;
   total areas of the plurality of gap regions are equal to one another;
   the plurality of strain gauges include:
     a plurality of inner strain gauges arrayed circumferentially; and
     a plurality of outer strain gauges arrayed circumferentially on a radially outer side relative to the plurality of inner strain gauges;
   the plurality of inner strain gauges and the plurality of outer strain gauges define a bridge circuit;
   the power transmission device further includes:
     an internally toothed gear;
     an externally toothed gear to mesh with the internally toothed gear; and
     a wave generator to generate cyclic flexure in the externally toothed gear; and
   any one of the internally toothed gear and the externally toothed gear is the machine component.

2. A machine component comprising:
   a base portion extending in a direction intersecting a central axis; and
   a plurality of strain gauges provided on the base portion and arrayed in a circumferential direction about the central axis; wherein a plurality of gap regions are provided between the strain gauges adjacent to each other in a circumferential direction;
   the plurality of gap regions include gap regions arranged at angular intervals of 90° about the central axis;
   the plurality of strain gauges include:
   a plurality of inner strain gauges arrayed circumferentially; and
   a plurality of outer strain gauges arrayed circumferentially on a radially outer side relative to the plurality of inner strain gauges; and
   the plurality of inner strain gauges and the plurality of outer strain gauges define a bridge circuit.

3. The machine component according to claim 2, wherein the plurality of strain gauges include:
   a plurality of first strain gauges defining a first bridge circuit; and
   a plurality of second strain gauges located radially outside relative to the plurality of first strain gauges and defining a second bridge circuit.

4. The machine component according to claim 1, wherein the plurality of strain gauges include:
   a plurality of first strain gauges defining a first bridge circuit; and
   a plurality of second strain gauges located radially outside relative to the plurality of first strain gauges and defining a second bridge circuit.

5. A power transmission device, comprising:
   a machine component including:
     a base portion extending in a direction intersecting a central axis; and
     a plurality of strain gauges provided on the base portion and arrayed in a circumferential direction about the central axis; wherein
   a plurality of gap regions are provided between the strain gauges adjacent to each other in a circumferential direction;
   the plurality of gap regions include gap regions aligned with one another at a same circumferential position about the central axis and arranged at angular intervals of 90° about the central axis;
   the plurality of strain gauges include:
     a plurality of first strain gauges defining a first bridge circuit; and
     a plurality of second strain gauges located radially outside relative to the plurality of first strain gauges and defining a second bridge circuit;
   total areas of the plurality of gap regions in the plurality of first strain gauges are equal to one another;
   total areas of the plurality of gap regions in the plurality of second strain gauges are equal to one another;
   the power transmission device further includes:
     an internally toothed gear;
     an externally toothed gear to mesh with the internally toothed gear; and
     a wave generator to generate cyclic flexure in the externally toothed gear; and
   any one of the internally toothed gear and the externally toothed gear is the machine component.

6. The machine component according to claim 3, wherein total areas of the plurality of gap regions in the plurality of first strain gauges are equal to one another; and
   total areas of the plurality of gap regions in the plurality of second strain gauges are equal to one another.

7. The machine component according to claim 4, wherein total areas of the plurality of gap regions in the plurality of first strain gauges are equal to one another; and
   total areas of the plurality of gap regions in the plurality of second strain gauges are equal to one another.

8. A power transmission device, comprising:
   a machine component including:
     a base portion extending in a direction intersecting a central axis; and
     a plurality of strain gauges provided on the base portion and arrayed in a circumferential direction about the central axis; wherein
   a plurality of gap regions are provided between the strain gauges adjacent to each other in a circumferential direction;

the plurality of gap regions include gap regions aligned with one another at a same circumferential position about the central axis and arranged at angular intervals of 90° about the central axis;

the plurality of strain gauges include:
 a plurality of first strain gauges defining a first bridge circuit; and
 a plurality of second strain gauges located radially outside relative to the plurality of first strain gauges and defining a second bridge circuit;

circumferential positions of the plurality of gap regions in the plurality of first strain gauges and circumferential positions of the plurality of gap regions in the plurality of second strain gauges are different;

the power transmission device further includes:
 an internally toothed gear;
 an externally toothed gear to mesh with the internally toothed gear; and
 a wave generator to generate cyclic flexure in the externally toothed gear; and any one of the internally toothed gear and the externally toothed gear is the machine component.

9. The machine component according to claim 3, wherein circumferential positions of the plurality of gap regions in the plurality of first strain gauges and circumferential positions of the plurality of gap regions in the plurality of second strain gauges are different.

10. The machine component according to claim 4, wherein circumferential positions of the plurality of gap regions in the plurality of first strain gauges and circumferential positions of the plurality of gap regions in the plurality of second strain gauges are different.

11. The machine component according to claim 5, wherein circumferential positions of the plurality of gap regions in the plurality of first strain gauges and circumferential positions of the plurality of gap regions in the plurality of second strain gauges are different.

12. A power transmission device, comprising:
 a machine component including:
  a base portion extending in a direction intersecting a central axis; and
  a plurality of strain gauges provided on the base portion and arrayed in a circumferential direction about the central axis; wherein a plurality of gap regions are provided between the strain gauges adjacent to each other in a circumferential direction;

the plurality of gap regions include gap regions aligned with one another at a same circumferential position about the central axis and arranged at angular intervals of 60° about the central axis;

total areas of the plurality of gap regions are equal to one another;

the plurality of strain gauges include:
 a plurality of inner strain gauges arrayed circumferentially; and
 a plurality of outer strain gauges arrayed circumferentially on a radially outer side relative to the plurality of inner strain gauges;

the plurality of inner strain gauges and the plurality of outer strain gauges define a bridge circuit;

the power transmission device further includes:
 an internally toothed gear;
 an externally toothed gear to mesh with the internally toothed gear; and
 a wave generator to generate cyclic flexure in the externally toothed gear; and any one of the internally toothed gear and the externally toothed gear is the machine component.

13. The machine component according to claim 12, wherein the plurality of strain gauges include:
 a plurality of first strain gauges defining a first bridge circuit; and
 a plurality of second strain gauges located radially outside relative to the plurality of first strain gauges and defining a second bridge circuit.

14. A robot comprising the power transmission device according to claim 1.

15. A robot comprising the power transmission device according to claim 5.

16. A robot comprising the power transmission device according to claim 8.

17. A robot comprising the power transmission device according to claim 12.

* * * * *